(12) United States Patent
Matsubara et al.

(10) Patent No.: US 7,132,929 B2
(45) Date of Patent: Nov. 7, 2006

(54) ANTITHEFT DEVICE AND ANTITHEFT METHOD

(75) Inventors: Manabu Matsubara, Kobe (JP); Minoru Yoshimura, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 144 days.

(21) Appl. No.: 10/886,711

(22) Filed: Jul. 9, 2004

(65) Prior Publication Data

US 2005/0012601 A1    Jan. 20, 2005

(30) Foreign Application Priority Data

Jul. 11, 2003    (JP)    ............................. 2003-196048

(51) Int. Cl.
B60R 25/10    (2006.01)

(52) U.S. Cl. ............................. 340/426.1; 340/426.13; 340/539.1; 340/568.1; 340/825.69; 340/825.72; 340/5.72; 307/10.1; 307/10.2

(58) Field of Classification Search ............. 340/568.1, 340/426.1, 426.13, 426.14, 539.1, 539.19, 340/825.69, 825.72, 5.61, 5.72; 307/10.1, 307/10.2; 180/287
See application file for complete search history.

(56) References Cited

U.S. PATENT DOCUMENTS 5,648,764 A * 7/1997 Nose et al. .................. 340/5.3

5,673,017 A * 9/1997 Dery et al. ............ 340/426.17

FOREIGN PATENT DOCUMENTS

| JP | 5-35518 | 5/1993 |
|---|---|---|
| JP | 09-256932 | 9/1997 |
| JP | 9-329075 | 12/1997 |
| JP | 10-44937 | 2/1998 |
| JP | 2002-79911 | 3/2002 |

OTHER PUBLICATIONS

Patent Abstracts of Japan, 10-067302, Mar. 1998.
Patent Abstracts of Japan, 06-312647, Nov. 1994.

* cited by examiner

*Primary Examiner*—Hung Nguyen
(74) *Attorney, Agent, or Firm*—Wenderoth, Lind & Ponack, L.L.P.

(57) ABSTRACT

The present invention teaches an antitheft device whereby an arming mode can be appropriately set when a remote operation for instructing to start an engine is conducted, comprising a section for setting the arming mode when a time T1 (e.g. 20–30 seconds) elapsed after receiving a door locking operation and a section for setting the arming mode when a time T2 (e.g. 2 seconds), being shorter than the time T1, elapsed after receiving a remote operation for instructing to start the engine.

13 Claims, 6 Drawing Sheets

ANTITHEFT DEVICE AND ANTITHEFT METHOD

BACKGROUND OF THE INVENTION

1. Field of the Invention

The present invention relates to an antitheft device and an antitheft method and, more particularly, to an antitheft device and an antitheft method for preventing incidents such as vehicle theft and theft from a vehicle.

2. Description of the Relevant Art

Both the number of cases and the incidence of incidents such as vehicle theft and theft from a vehicle are tending upward. Therefore, in recent years, various antitheft devices for preventing vehicle theft and theft from a vehicle have been proposed (for example, Japanese Kokai No.1998-44937, and Japanese Utility Model Application No.1993-35518 and No.2002-79911).

Figure 6:
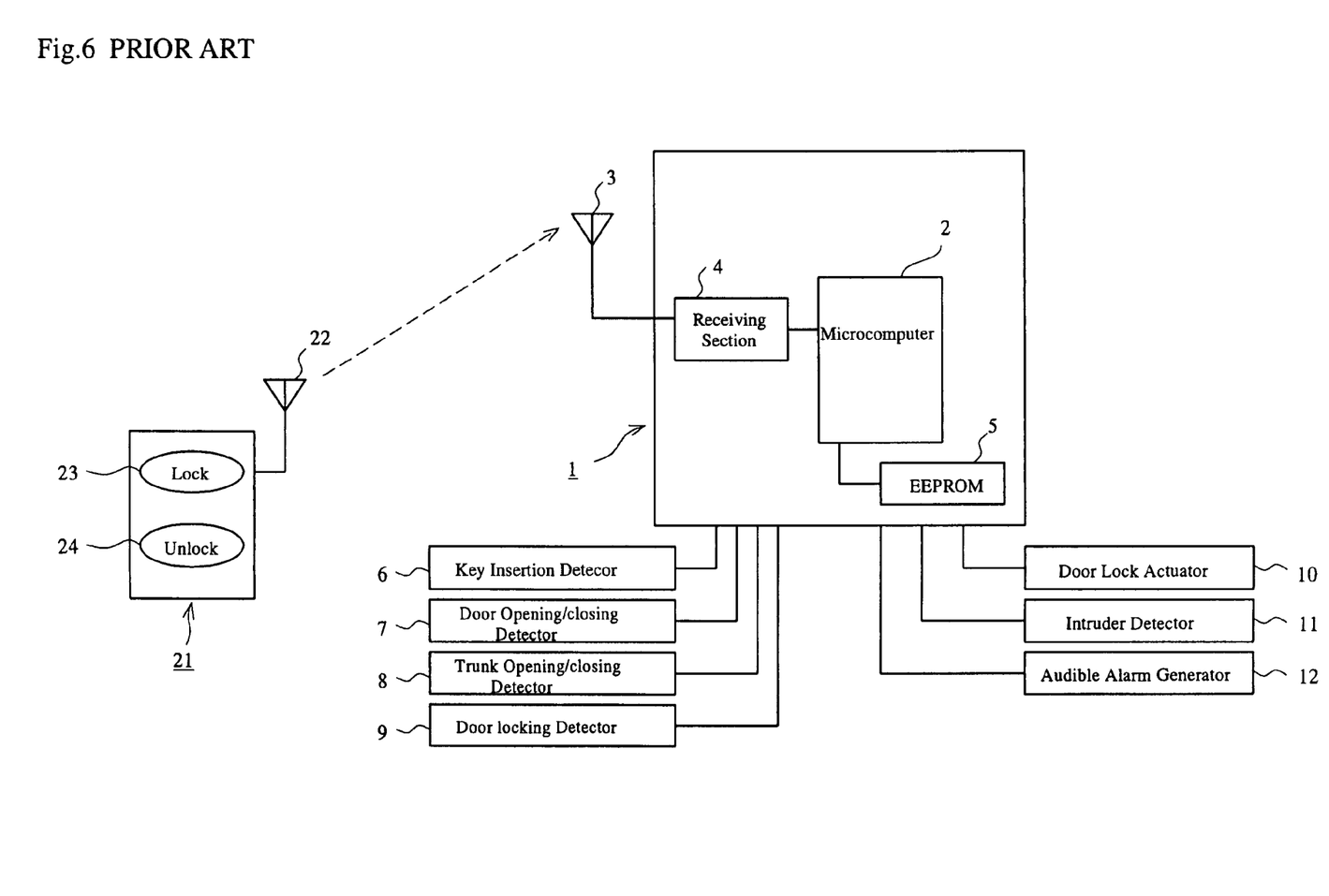
FIG. 6 is a block diagram schematically showing the principal part of an antitheft system comprising a conventional antitheft device.

FIG. 6 is a block diagram schematically showing the principal part of an antitheft system comprising a conventional antitheft device. Reference numeral 1 in the figure represents an antitheft device having a function of door locking control by remote operation, comprising a microcomputer 2, an antenna 3 and a receiving section 4 for receiving signals sent from a portable transmitter 21, and an EEPROM 5 in which an ID code is stored.

To the antitheft device 1, a key insertion detector 6 for detecting whether an ignition key has been inserted in a key cylinder, a door opening/closing detector 7 for detecting the open/closed state of doors, a trunk opening/closing detector 8 for detecting the open/closed state of a trunk lid, a door locking detector 9 for detecting the locked/unlocked state of the doors, a door lock actuator 10 for locking/unlocking the doors, an intruder detector 11 for detecting an intruder into a vehicle and an audible alarm generator 12 for generating an audible alarm are connected. Here, as the intruder detector 11, a vibration sensor for detecting breaking of glass, an ultrasonic sensor for detecting a motion of a person who intruded into the vehicle, a tilting sensor for detecting a tilt of the vehicle and a sensor for detecting a decrease in voltage of a battery are exemplified.

The portable transmitter 21 comprises a microcomputer (not shown), an antenna 22 and a transmitting section (not shown) for transmitting a prescribed signal to the antitheft device 1, an EEPROM (not shown) in which an ID code is stored, and button switches 23 and 24 for instructing to lock and unlock the doors by remote operation, respectively.

When the button switch 23 is pressed, the microcomputer of the portable transmitter 21 sends a signal including the ID code and a door locking command code through the antenna 22 to the outside. On the other hand, when the button switch 24 is pressed, the microcomputer thereof sends a signal including the ID code and a door unlocking command code through the antenna 22 to the outside.

When receiving a signal instructing to lock the doors from the portable transmitter 21 being carried by its user, the antitheft device 1 judges whether the signal is proper or not (or whether the signal is not sent from any transmitter other than the portable transmitter 21). When the signal is judged to be proper, all the doors are locked by controlling the door lock actuator 10 and the like and an arming mode for being on the alert for theft is set. At that time, in a case where all the doors and the trunk lid are closed, all the doors being in the locked state when a preset delay time (e.g. 20–30 seconds) has elapsed since the necessity to set the arming mode was determined, the arming mode is set. Here, the reason why the arming mode is set when the prescribed time elapsed after door locking control is that it is supposed that there is a fellow passenger who gets out of the vehicle after the user (being a driver in most cases) who operates the portable transmitter 21.

When the arming mode is set, monitoring of an unauthorized action is started. When an unauthorized action is detected, an audible alarm is generated by controlling the audible alarm generator 12 and the like. For example, when opening of a door or the trunk lid, breaking of glass, a tilt of the vehicle or removal of the battery (or a decrease in battery voltage) is detected, an audible alarm is generated.

When receiving a signal instructing to lock the doors by key operation, the antitheft device 1 controls the door lock actuator 10 and the like so as to lock all the doors and sets the arming mode in the same manner as the above. Likewise, in a case where all the doors and the trunk lid are closed, all the doors being in the locked state when the prescribed delay time has elapsed, the arming mode is set.

By the way, recently, as to not only door locking but also engine starting, remote operation has been realized (for example, Japanese Utility Model Application No.2002-79911, Japanese Kokai No.1997-256932 and Japanese Utility Model Application No.1997-329075). The realization of engine starting by remote operation has an excellent effect that the vehicle environment can be made comfortable by a warm-up before getting-on.

In cases where such remote operation for instructing to start the engine is conducted, the user is often away from the vehicle. Therefore, if the engine is started by remote operation in a state where the arming mode has not been set, for example, in a case where the user carelessly conducted an unlocking operation in conducting an engine start by remote operation, the risk of suffering vehicle theft becomes extremely high. Therefore, it becomes important that the arming mode is also set in the case of the engine being started by remote operation.

However, in a conventional antitheft device, even in the case of engine starting by remote operation (or although the vehicle is often unoccupied and no passenger gets out of the vehicle when the engine is started by remote operation), the arming mode is set after an elapse of a delay time preset in consideration of a fellow passenger's getting-off, similarly to the case of setting the arming mode after door locking using a portable transmitter or by key operation.

When an engine start by remote operation is conducted with putting/taking luggage into/out of the trunk in the state of the trunk lid being opened after the doors of the vehicle were unlocked (or after the arming mode was canceled), the arming mode is not set in some cases. Moreover, when the engine is started, the vehicle creates vibrations or something. Therefore, if an alert status in the arming mode being set in the case of receiving a remote operation for instructing to start the engine (such as detected subjects for detecting an unauthorized action or the detection sensitivity for detecting the unauthorized action) is the same as an alert status in the arming mode being set in the case of receiving a door locking operation, a vibration sensor or the like as a theft detector reacts thereto, resulting in an inconvenience.

SUMMARY OF THE INVENTION

The present invention was developed in order to solve the above problem, and it is an object of the present invention to provide an antitheft device and an antitheft method, whereby an arming mode can be appropriately set when a remote operation for instructing to start an engine is conducted and an alert status in the case of the arming mode being set can be made appropriate.

In order to achieve the above object, an antitheft device according to the first aspect of the present invention is characterized by comprising a first judgment section for judging whether a first predetermined condition for setting an arming mode has been met when receiving a prescribed operation by a user, a first setter for setting the arming mode when it is judged that the first predetermined condition has been met by the first judgment section, a second judgment section for judging whether a second predetermined condition for setting the arming mode has been met when receiving a remote operation for instructing to start an engine by the user and a second setter for setting the arming mode when it is judged that the second predetermined condition has been met by the second judgment section, wherein the first predetermined condition and the second predetermined condition are different.

Using the antitheft device according to the first aspect of the present invention, not only when the prescribed operation (such as a remote operation for instructing to lock doors or a key operation for instructing to lock the doors) is conducted and the first predetermined condition (for example, all the doors are closed, a trunk lid is closed, and 20–30 seconds has elapsed since the door locking operation) is met, but also when the remote operation for instructing to start the engine is conducted and the second predetermined condition is met, the arming mode is set.

Thus, even if the engine is started by remote operation in a state where the arming mode has not been set, the arming mode is set, resulting in a reduced risk of suffering vehicle theft. Moreover, since the condition for setting the arming mode in the case of receiving the prescribed operation (such as a remote operation or a key operation for instructing to lock the doors) and that in the case of receiving a remote operation for instructing to start the engine are different, it becomes possible to set the arming mode even if the remote operation for instructing to start the engine is conducted with opening the trunk lid and putting/taking luggage into/out of the trunk. The arming mode can be set in a form suitable for the remote operation for instructing to start the engine.

An antitheft device according to the second aspect of the present invention is characterized by the first predetermined condition including an elapse of a first preset time after receiving the prescribed operation, and the second predetermined condition including an elapse of a second preset time after receiving an engine start command by remote operation, wherein the second preset time is shorter than the first preset time in the antitheft device according to the first aspect of the present invention.

As described in the "Description of the Relevant Art", in the conventional antitheft device, the arming mode is set when 20–30 seconds elapsed after a remote operation or a key operation for instructing to lock the doors was received. This is because it is supposed that there is a fellow passenger who gets out of the vehicle after the user (being a driver in most cases) who operates the door lock.

However, in the case of starting the engine, it is not necessary to suppose the cases where there is a fellow passenger who gets out of the vehicle after the user, differently from the case of door locking, so that the elapse of 20–30 seconds is not needed. Since the user is away from the vehicle, the risk of suffering vehicle theft becomes rather larger if the elapse of 20–30 seconds is set after receiving the remote operation.

Using the antitheft device according to the second aspect of the present invention, the first predetermined condition (such as a condition for setting the arming mode in the case of receiving a door locking operation) includes an elapse of the first preset time after receiving the prescribed operation (such as an elapse of 20–30 seconds after a remote operation or a key operation for instructing to lock the doors was conducted), the second predetermined condition includes an elapse of the second preset time after receiving the engine start command by remote operation, and the second preset time is set shorter than the first preset time.

When not the first preset time but the second preset time (e.g. 2 seconds) being shorter than the first preset time (e.g. 20–30 seconds) elapsed after receiving the engine start command by remote operation, the arming mode is set. Thus, the risk of suffering vehicle theft can be reduced.

Here, the second preset time may be set to be 0 second, or actually no elapsed time may be set. However, when the engine is started, various phenomena (such as vehicle vibrations, an air flow inside the vehicle and an occurrence of noise) are caused thereby. Therefore, since there is a possibility that a tilting sensor or the like causes errors in detection so that an audible alarm is generated in spite of no unauthorized action, it is desirable to set an elapsed time of a few seconds.

An antitheft device according to the third aspect of the present invention is characterized by the second preset time being almost 0 second, and the second setter which sets the arming mode as soon as receiving the remote operation for instructing to start the engine by the user in the antitheft device according to the second aspect of the present invention.

Using the antitheft device according to the third aspect of the present invention, the second preset time is almost 0 second, and the arming mode is set as soon as the engine start command by remote operation is received. Thus, the risk of suffering vehicle theft can be further reduced. However, as described above, there is a possibility that the tilting sensor or the like causes errors in detection when the second preset time is almost 0 second. Therefore, it is desirable to set the detection sensitivity lower for a few seconds after setting the arming mode.

An antitheft device according to the fourth aspect of the present invention is characterized by the first predetermined condition which includes that a trunk lid is closed, whereas the second predetermined condition does not include that the trunk lid is closed in the antitheft device according to the first aspect of the present invention.

As described in the "Description of the Relevant Art", the remote operation or key operation for instructing to lock the doors is conducted basically when the user leaves the vehicle. As a condition for setting the arming mode in that case, all the doors are closed as a matter of course, and the trunk lid is desirably closed.

On the other hand, the remote operation for instructing to start the engine is conducted basically when the user is going to get on the vehicle soon (or when the user is going to drive away). Therefore, for example, a case is considered, wherein during working such as opening the trunk lid and putting luggage into the trunk space without getting on the vehicle, the user conducts the remote operation for instructing to start the engine.

However, when the condition for setting the arming mode includes that the trunk lid is closed, the arming mode is not set in the above case.

Using the antitheft device according to the fourth aspect of the present invention, the first predetermined condition (such as a condition for setting the arming mode through receiving the remote operation or key operation for instructing to lock the doors) includes that the trunk lid is closed, but the second predetermined condition (or a condition for setting the arming mode through receiving the remote operation for instructing to start the engine) does not include that the trunk lid is closed.

As a result, for example, even if the remote operation for instructing to start the engine is conducted during working such as opening the trunk lid and putting luggage into the trunk space without getting on the vehicle, the arming mode is set, resulting in an improvement in convenience with crime prevention for vehicle theft being kept.

An antitheft device according to the fifth aspect of the present invention is characterized by comprising a first judgment section for judging whether a first predetermined condition for setting an arming mode has been met when receiving a prescribed operation by a user, a first setter for setting the arming mode when it is judged that the first predetermined condition has been met by the first judgment section, a second judgment section for judging whether a second predetermined condition for setting the arming mode has been met when receiving a remote operation for instructing to start an engine by the user, and a second setter for setting the arming mode when it is judged that the second predetermined condition has been met by the second judgment section, wherein an alert status in the arming mode being set by the first setter and an alert status in the arming mode being set by the second setter are different.

Using the antitheft device according to the fifth aspect of the present invention, not only when the prescribed operation (such as a remote operation or a key operation for instructing to lock doors) is conducted and the first predetermined condition (for example, all the doors are closed, a trunk lid is closed, and 20–30 seconds has elapsed since the door locking operation) is met, but also when the remote operation for instructing to start the engine is conducted and the second predetermined condition is met, the arming mode is set.

Thus, even if the engine is started by remote operation in a state where the arming mode has not been set, the arming mode is set, resulting in a reduced risk of suffering vehicle theft. Moreover, since the alert status in the arming mode (such as detected subjects for detecting an unauthorized action or the detection sensitivity for detecting the unauthorized action) in the case of being set through receiving the prescribed operation (such as a remote operation or a key operation for instructing to lock the doors) and that in the case of being set through receiving the remote operation for instructing to start the engine are different, it becomes possible not to detect as theft even if a vibration sensor reacts as the engine is started, for example. As a result, the alert status in the arming mode being set through receiving the remote operation for instructing to start the engine can be made suitable.

An antitheft device according to the sixth aspect of the present invention is characterized by detected subjects for detecting an unauthorized action in the arming mode being set by the second setter which are reduced, compared with detected subjects for detecting an unauthorized action in the arming mode being set by the first setter in the antitheft device according to the fifth aspect of the present invention.

As described in the "Description of the Relevant Art", in the conventional antitheft device, when the arming mode is set, monitoring of an unauthorized action is started. For example, when such an unauthorized action that a door or a trunk lid was opened by someone, that glass was broken, that the vehicle was tilted or that a battery was removed is detected, an audible alarm is generated. Here, whether the battery was removed can be judged by monitoring a decrease in voltage supplied to a microcomputer or the like.

However, when the engine is started, the battery voltage decreases. Therefore, when the battery voltage is monitored, an audible alarm is generated in spite of no unauthorized action.

Using the antitheft device according to the sixth aspect of the present invention, the detected subjects for detecting an unauthorized action in the arming mode being set through receiving the remote operation for instructing to start the engine is reduced, compared with the detected subjects for detecting an unauthorized action in the arming mode being set through receiving the prescribed operation (such as a remote operation or a key operation for instructing to lock the doors). Thus, it is possible to prevent an audible alarm from being generated in spite of no unauthorized action.

An antitheft device according to the seventh aspect of the present invention is characterized by the opening of the trunk lid being excluded from the detected subjects in the arming mode being set by the second setter in the antitheft device according to the sixth aspect of the present invention.

Using the antitheft device according to the seventh aspect of the present invention, in the arming mode being set through receiving the remote operation for instructing to start the engine, it is possible not to regard the opening of the trunk lid as an unauthorized action. Thus, even after starting the engine by remote operation, working such as opening the trunk lid and putting luggage into the trunk space can be conducted.

That the opening of the trunk lid is excluded from the detected subjects for detecting an unauthorized action (or not included in the condition for alarm) in the arming mode being set through receiving the remote operation for instructing to start the engine is particularly effective in a system wherein the engine is stopped from the viewpoint of an improvement in security when the arming mode is canceled through receiving an instruction to unlock the doors using a portable transmitter or by key operation.

In such system (or a system having a construction for stopping the engine when the arming mode is canceled), in a case where the alarm condition in the arming mode being set through receiving a remote operation or a key operation for instructing to lock the doors and the alarm condition in the arming mode being set through receiving a remote operation for instructing to start the engine are the same, the alarm condition including the opening of the trunk lid, an alarm is generated when the user tries to open the trunk in a state where the engine has been started after the remote operation for instructing to start the engine was conducted (or in a state where the arming mode has been set).

Therefore, it is necessary to cancel the arming mode once for opening the trunk lid to put/take luggage into/out of the trunk. When the arming mode is canceled, the engine is stopped in the above system. As a result, another remote operation for instructing to start the engine must be conducted after finishing putting in/taking out the luggage, resulting in a troublesome operation.

Concerning this point, in the antitheft device according to the seventh aspect of the present invention, since the opening of the trunk lid is excluded from the alarm condition in the arming mode being set through receiving a remote operation for instructing to start the engine, it is possible to open the trunk lid to put/take luggage into/out of the trunk with the engine kept running.

An antitheft device according to the eighth aspect of the present invention is characterized by the detection sensitivity for detecting an unauthorized action in the arming mode being set by the second setter, which is set lower than the detection sensitivity for detecting the unauthorized action in the arming mode being set by the first setter in the antitheft device according to the fifth aspect of the present invention.

As described above, in the conventional antitheft device, when the arming mode is set, monitoring of an unauthorized action is started. For example, such an unauthorized action that glass was broken or that the vehicle was tilted is detected by a vibration sensor or a tilting sensor, respectively. However, when the engine is started, various phenomena (such as vehicle vibrations, an air flow inside the vehicle and an occurrence of noise) are caused thereby. Therefore, there is a possibility that these vibration sensor, tilting sensor and the like cause errors in detection, so that an audible alarm might be generated in spite of no unauthorized action.

Using the antitheft device according to the eighth aspect of the present invention, the detection sensitivity for detecting an unauthorized action in the arming mode being set through receiving the remote operation for instructing to start the engine is set lower than the detection sensitivity for detecting an unauthorized action in the arming mode being set through receiving the prescribed operation (such as a remote operation or a key operation for instructing to lock the doors). Thus, it is possible to prevent an audible alarm from being generated in spite of no unauthorized action.

An antitheft device according to the ninth aspect of the present invention is characterized by comprising a third judgment section for judging whether a third predetermined condition has been met in a case where the arming mode by the second setter has been set and an alert status setting section for setting an alert status in the arming mode to be the same as the alert status in the arming mode being set by the first setter when it is judged that the third predetermined condition has been met by the third judgment section, wherein the third predetermined condition includes a stop of the engine in the antitheft device according to the fifth aspect of the present invention.

Using the antitheft device according to the ninth aspect of the present invention, when the third predetermined condition (including a stop of the engine) was met in a state where the arming mode has been set through receiving a remote operation for instructing to start the engine, the alert status in the arming mode is set to be the same as the alert status in the arming mode being set through receiving the prescribed operation (such as a remote operation or a key operation for instructing to lock the doors).

When the engine is stopped, errors in detection caused by vehicle vibrations, an air flow inside the vehicle, an occurrence of noise or the like originating in a start of the engine are resolved, so that it becomes unnecessary to reduce the detected subjects for detecting an unauthorized action or lower the detection sensitivity for detecting the unauthorized action. That is, the reduction of the detected subjects for detecting the unauthorized action or the lowered detection sensitivity for detecting an unauthorized action is ended when it becomes unnecessary, resulting in an improvement in crime prevention of vehicle theft.

An antitheft device according to the tenth aspect of the present invention is characterized by the first predetermined condition and the second predetermined condition which are different in the antitheft device according to the fifth aspect of the present invention.

Using the antitheft device according to the tenth aspect of the present invention, the condition for setting the arming mode in the case of receiving the prescribed operation (such as a remote operation or a key operation for instructing to lock the doors) and that in the case of receiving a remote operation for instructing to start the engine are different. Therefore, for example, even if a remote operation for engine starting is conducted with opening the trunk lid and putting/taking luggage into/out of the trunk, the arming mode can be set. The arming mode can be set in a form suitable for the remote operation for instructing to start the engine.

An antitheft device according to the eleventh aspect of the present invention is characterized by comprising a starter for starting an engine of a vehicle when receiving the remote operation for instructing to start the engine by the user in the antitheft device according to the first aspect of the present invention.

If the starter is not mounted, it is required to capture a signal showing that the engine was started or the like from another device. But in the antitheft device according to the eleventh aspect of the present invention, the starter is mounted, so that it is not required to capture a signal showing that the engine was started or the like from another device. Or, it is not required to be connected to another device using a line.

Moreover, it is not required to mount a remote starting device having the starter on the vehicle, besides the antitheft device. As a result, not only the activity of mounting the device onto the vehicle becomes easy to conduct, but also the number of devices mounted on the vehicle can be decreased.

An antitheft device according to the twelfth aspect of the present invention is characterized by comprising a receiving section receiving a signal transmitted from a transmitter and a microcomputer, operatively connected to the receiving section, generating an alarm when a predetermined status is detected and controlling a start of an engine in response to a signal instructing the start of the engine transmitted from the transmitter, wherein the microcomputer sets an arming mode after a first delay time in response to a signal instructing to set the arming mode transmitted from the transmitter and sets the arming mode after a second delay time, being shorter than the first delay time, in response to the signal instructing the start of the engine transmitted from the transmitter.

Using the antitheft device according to the twelfth aspect of the present invention, when the signal instructing to set the arming mode transmitted from the transmitter is received, the arming mode is set after the first delay time, while the arming mode is set after the second delay time, being shorter than the first delay time, when the signal instructing the start of the engine transmitted from the transmitter is received.

That is, the arming mode is set when not the first delay time but the second delay time (e.g. 2 seconds), being shorter than the first delay time (e.g. 20–30 seconds), elapsed after the engine start command by remote control was received. Thus, it is possible to reduce a risk of suffering vehicle theft.

Here, the second delay time may be set to be 0 second, or actually no delay time may be set. However, when the engine is started, various phenomena (such as vehicle vibrations, an air flow inside the vehicle and an occurrence of noise) are caused thereby. Therefore, since there is a possibility that a tilting sensor or the like causes errors in detection, so that an audible alarm is generated in spite of no unauthorized action, it is desirable to set a delay time of a few seconds.

An antitheft method according to the first aspect of the present invention is characterized by comprising the steps of setting an arming mode when a first preset time elapsed after receiving a prescribed operation by a user and setting the arming mode when a second preset time, being shorter than the first preset time, elapsed after receiving a remote operation for instructing to start an engine by the user.

Using the antitheft method according to the first aspect of the present invention, not only when the first preset time (e.g. 20–30 seconds) elapsed after the prescribed operation (such as a remote operation or a key operation for instructing to lock doors) was conducted, but also when the second preset time (e.g. 2 seconds), being shorter than the first preset time, elapsed after the remote operation for instructing to start the engine was conducted, the arming mode is set.

Thus, even if the engine is started by remote operation in a state where the arming mode has not been set, the arming mode is set, resulting in a reduced risk of suffering vehicle theft.

By the way, as described in the "Description of the Relevant Art", in the conventional antitheft device, the arming mode is set when 20–30 seconds elapsed after a remote operation or a key operation for instructing to lock the doors was received. This is because it is supposed that there is a fellow passenger who gets out of the vehicle after the user (being a driver in most cases) who operates the door lock.

However, in the case of starting the engine, it is not necessary to suppose the cases where there is a fellow passenger who gets out of the vehicle after the user, differently from the case of door locking, so that the elapse of 20–30 seconds is not needed. Since the user is away from the vehicle, the risk of suffering vehicle theft becomes rather larger if the elapse of 20–30 seconds is set after receiving a remote operation.

Using the antitheft method according to the first aspect of the present invention, the second preset time is set shorter than the first preset time. That is, when not the first preset time but the second preset time (e.g. 2 seconds), being shorter than the first preset time (e.g. 20–30 seconds), elapsed after receiving an engine start command by remote operation, the arming mode is set. Thus, the risk of suffering vehicle theft can be reduced.

Here, the second preset time may be set to be 0 second, or actually no elapsed time may be set. However, when the engine is started, various phenomena (such as vehicle vibrations, an air flow inside the vehicle and an occurrence of noise) are caused thereby. Therefore, since there is a possibility that a tilting sensor or the like causes errors in detection, so that an audible alarm is generated in spite of no unauthorized action, it is desirable to set an elapsed time of a few seconds.

DESCRIPTION OF THE PREFERRED EMBODIMENTS

Figure 1:
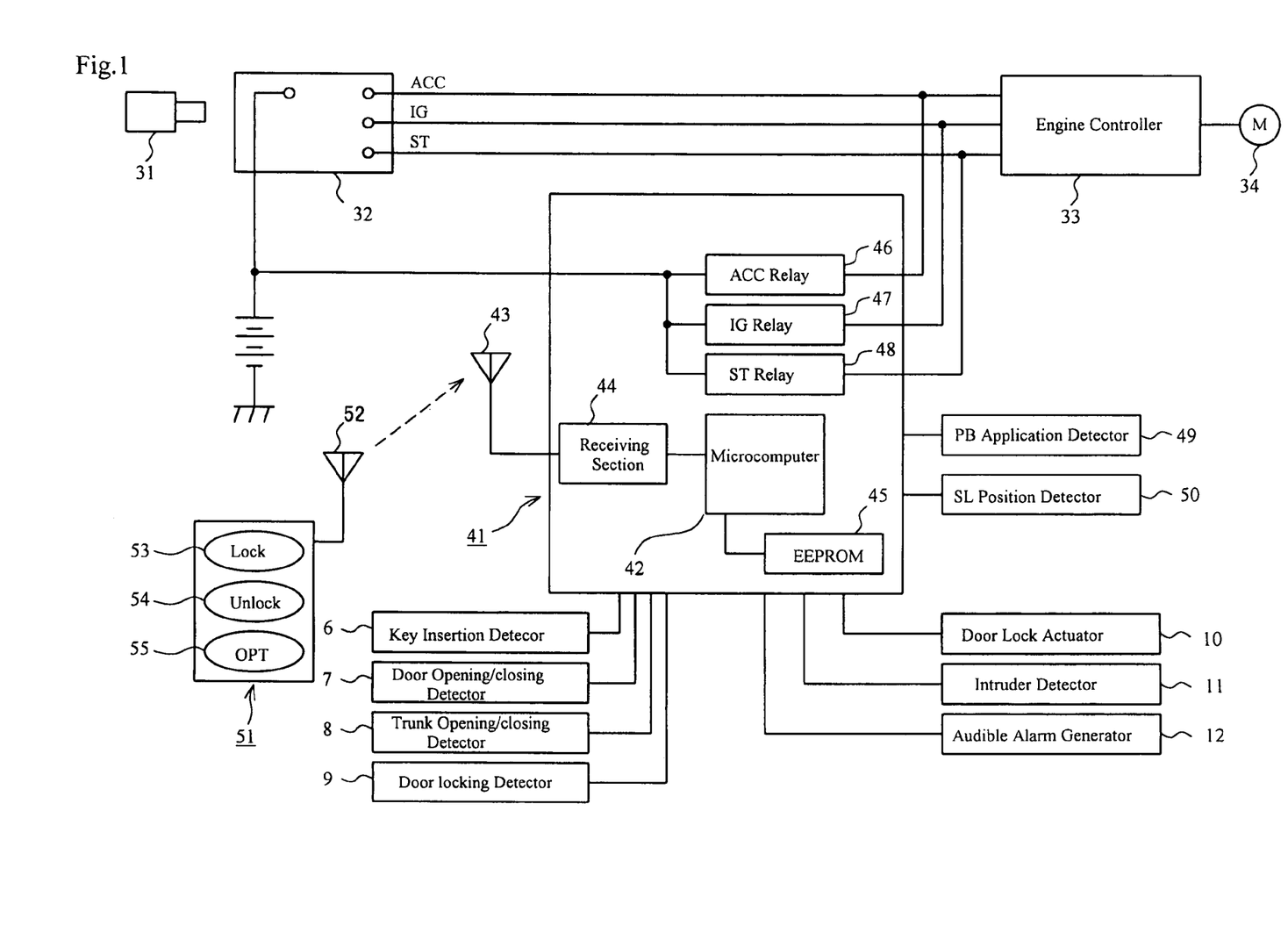
FIG. 1 is a block diagram schematically showing the principal part of an antitheft system comprising an antitheft device according to a first embodiment of the present invention.

The preferred embodiments of the antitheft device and the antitheft method according to the present invention are described below by reference to the Figures of the drawings. FIG. 1 is a block diagram schematically showing the principal part of an antitheft system comprising an antitheft device according to a first embodiment. Here, the same components as those in the antitheft system shown in FIG. 6 are similarly marked and are not described below.

When an ignition key 31 is inserted into a key cylinder 32 by a user and is turned to the starter position, an ACC signal, an IG signal and a starter signal are provided from the key cylinder 32 to an engine controller 33. When the engine controller 33 receives these signals, a self starter motor 34 is activated so as to start an engine.

Reference numeral 41 in the figure represents an antitheft device, comprising a microcomputer 42, an antenna 43 and a receiving section 44 for receiving signals sent from a portable transmitter 51, an EEPROM 45 in which an ID code is stored, an ACC relay 46, an IG relay 47 and a ST relay 48.

To the antitheft device 41, a key insertion detector 6, a door opening/closing detector 7, a trunk opening/closing detector 8, a door locking detector 9, a door lock actuator 10, an intruder detector 11, an audible alarm generator 12, a parking brake application detector 49 for detecting the application of a parking brake and a selector lever position detector 50 for detecting in which position a selector lever is are connected. As a result, that the ignition key 31 has been inserted in the key cylinder 32, the open/closed state of doors, the open/closed state of a trunk lid, the state of door locks, the presence or absence of an intruder into a vehicle, that the parking brake is applied and that the selector lever is in the parking position, can be recognized in the antitheft device 41. Here, as the intruder detector 11, a vibration sensor for detecting breaking of glass, an ultrasonic sensor for detecting a motion of a person who intruded into the vehicle, a tilting sensor for detecting a tilt of the vehicle and a sensor for detecting a decrease in battery voltage are exemplified.

The antitheft device 41 controls the door lock actuator 10 so as to be able to lock or unlock the doors, and controls the audible alarm generator 12 so as to be able to generate an audible alarm.

A portable transmitter 51 comprises a microcomputer (not shown), an antenna 52 and a transmitting section (not shown) for sending a prescribed signal to the antitheft device 41, an EEPROM (not shown) in which an ID code is stored, and button switches 53, 54 and 55 for instructing to lock the doors, for instructing to unlock the doors and for option, respectively, by remote operation.

The microcomputer of the portable transmitter 51 transmits a signal including the ID code and a door locking command code through the antenna 52 to the outside when the button switch 53 only is pressed. On the other hand, the microcomputer thereof transmits a signal including the ID code and a door unlocking command code through the antenna 52 to the outside when the button switch 54 only is pressed.

The microcomputer of the portable transmitter 51 transmits a signal including the ID code and an engine start command code through the antenna 52 to the outside when the button switch 53 and the button switch 55 for option are pressed together. On the other hand, the microcomputer thereof transmits a signal including the ID code and an engine stop command code through the antenna 52 to the outside when the button switch 54 and the button switch 55 are pressed together.

When receiving a signal instructing to lock the doors from the portable transmitter 51 being carried by its user, the antitheft device 41 judges whether the signal is proper or not (or whether the signal was not sent from any transmitter other than the portable transmitter 51). When the signal is judged to be proper, the door lock actuator 10 is controlled so as to lock all the doors. In a case where all the doors and the trunk lid are closed, all the doors being in the locked state when a preset time (e.g. 20–30 seconds) elapsed thereafter, an arming mode for being on the alert for theft is set.

Here, the reason why the arming mode is set when the preset time elapsed after door locking control is that it is supposed that there is a fellow passenger who gets out of the vehicle after the user (being a driver in most cases) who operates the portable transmitter 51. Moreover, as soon as a proper door locking signal is received, the doors are locked. But in another embodiment, the doors may be locked after a predetermined condition was met (for example, after confirming that all the doors are closed).

When the arming mode is set, monitoring of an unauthorized action is started. When an unauthorized action is detected, the audible alarm generator 12 is controlled so as to generate an audible alarm. For example, when that a door or the trunk lid was opened, that glass was broken, that the vehicle was tilted, or that the battery was removed (or a decrease in battery voltage) is detected, an audible alarm is generated.

When receiving a signal instructing to lock the doors by key operation, the antitheft device 41 controls the door lock actuator 10 so as to lock all the doors, similarly to the above. In a case where all the doors and the trunk lid are closed, all the doors being in the locked state when the preset time elapsed thereafter, the arming mode is set.

When receiving a signal instructing to start the engine from the portable transmitter 51, the antitheft device 41 judges whether the signal is proper or not. When the signal is judged to be proper, whether a remote starting condition (for example, the ignition key 31 has not been inserted in the key cylinder 32, the doors are closed, the parking brake is applied, and the selector lever is in the parking position) has been met is judged. When it is judged that the remote starting condition has been met, the ACC relay 46, IG relay 47 and ST relay 48 are rendered in the ON state so as to provide an ACC signal, an IG signal and a starter signal to the engine controller 33. Here, the ACC relay 46 and IG relay 47 are kept in the ON state till the engine is stopped, while the ST relay 48 is kept in the ON state for a few seconds (e.g. 2–3 seconds). When receiving these signals, the engine controller 33 activates the self starter motor 34 so as to start the engine, in a similar manner to the case where the ignition key 31 is inserted into the key cylinder 32 and turned to the starter position.

When a preset time (e.g. 10–15 minutes) elapsed with the remote starting condition kept satisfied after engine starting, the antitheft device 41 renders the ACC relay 46 and IG relay 47 in the OFF state so as to stop providing the ACC signal and IG signal to the engine controller 33. When the engine controller 33 comes not to receive these signals, it stops driving the self starter motor 34 so as to stop the engine.

The processing operation performed by the microcomputer 42 in the antitheft device 41 according to the first embodiment is described by reference to flow charts shown in FIGS. 2–5. First, as initialization, a flag $f_1$ indicating that the arming mode has been set, a flag $f_2$ indicating that the arming mode was set through an engine start by remote operation and a flag $f_3$ indicating that the engine is running are set at 0 (Step 1).

Figure 2:
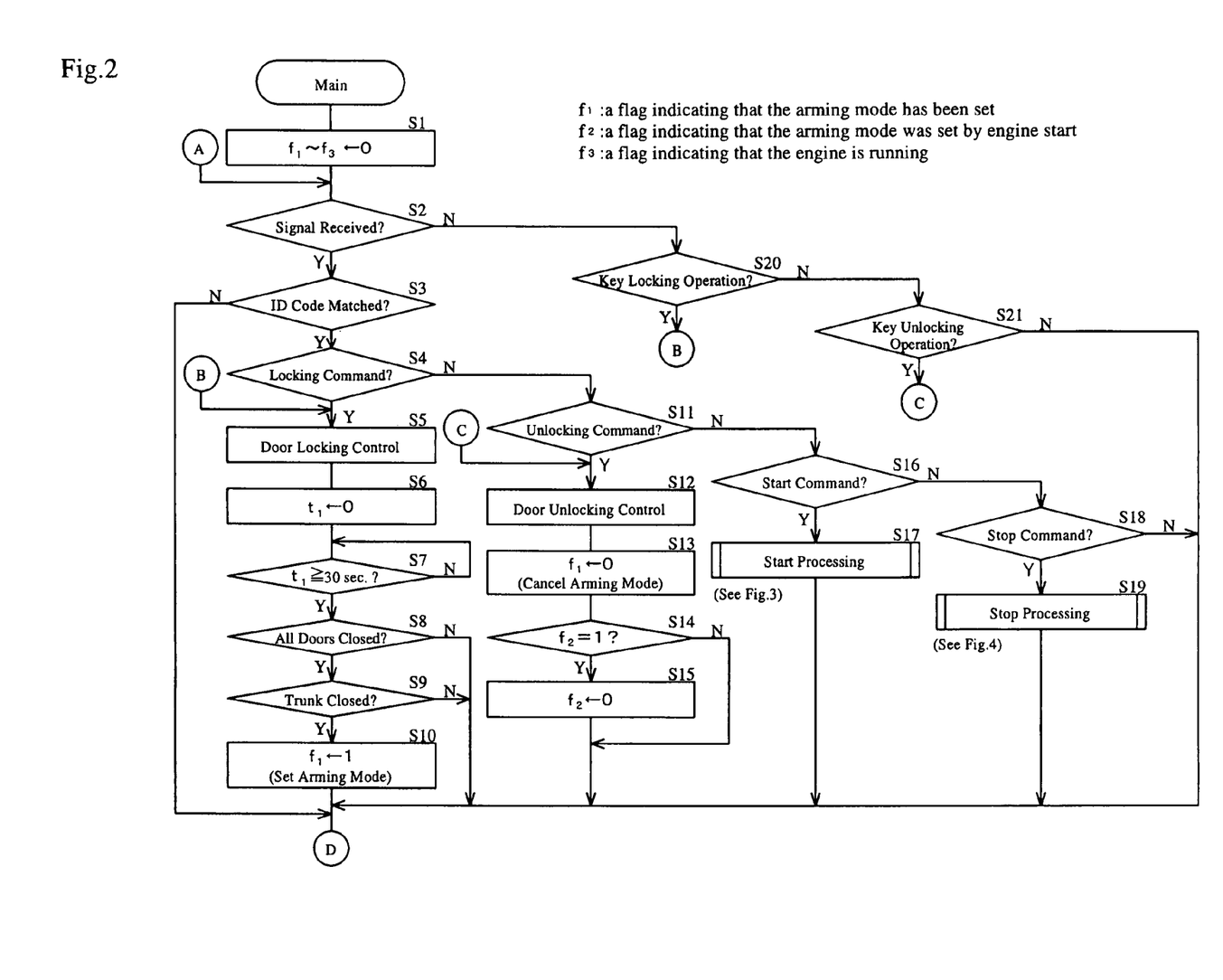
FIG. 2 is a flow chart showing the processing operation performed by a microcomputer in the antitheft device according to the first embodiment.

Whether a signal was received through the antenna 43 and receiving section 44 is judged (Step 2). When it is judged that a signal was received, whether an ID code included in the received signal matches the ID code stored in the EEPROM 45 is judged (Step 3).

When it is judged that the ID code included in the received signal is identical to the ID code stored in the EEPROM 45 (or that a signal transmitted from the portable transmitter 51 being carried by an authorized user was received), whether a door locking command code is included in the signal transmitted from the portable transmitter 51 is judged (Step 4). On the other hand, when it is judged that the ID code included in the received signal is not identical to the ID code stored in the EEPROM 45, the operation directly goes to Step 51 (FIG. 5) since the processing operations in Steps 4–19 are not required.

When it is judged that the door locking command code is included in the signal transmitted from the portable transmitter 51 in Step 4, the door lock actuator 10 is controlled so as to lock the doors (Step 5), and a timer $t_1$ is reset at 0 and is started up (Step 6).

Whether the timer $t_1$ has counted to a preset time $t_1'$ (e.g. 30 seconds) or more is judged (Step 7). When it is judged that the timer $t_1$ has counted to 30 seconds or more (or that 30 seconds has elapsed since the door locking command was received), whether all the doors are closed is judged based on information obtained from the door opening/closing detector 7 (Step 8). When it is judged that all the doors are closed, whether the trunk lid is closed is judged based on information obtained from the trunk opening/closing detector 8 (Step 9).

Figure 5:
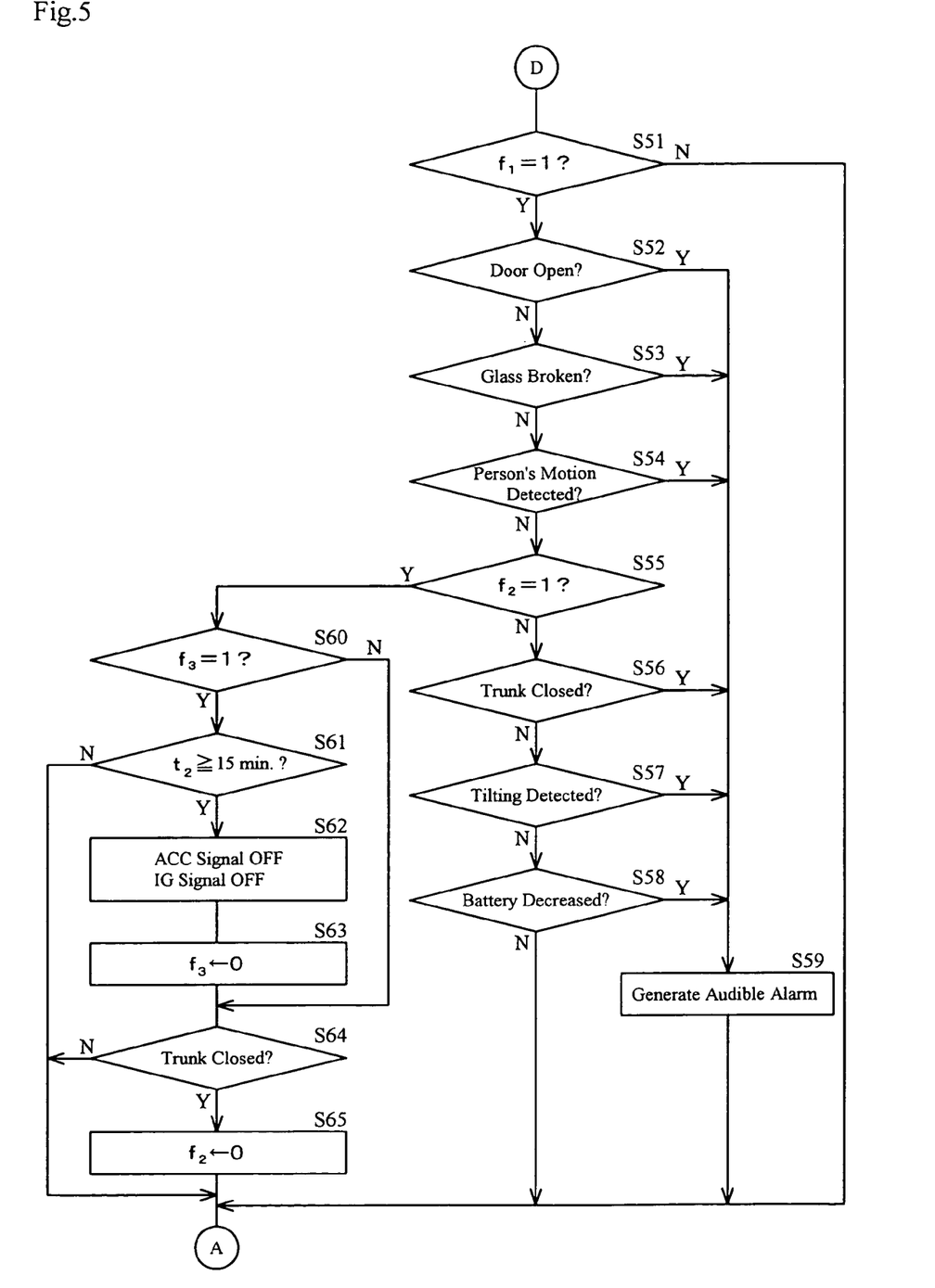
FIG. 5 is a flow chart showing the processing operation performed by the microcomputer in the antitheft device according to the first embodiment.

When it is judged that the trunk lid is closed (or that all the doors are closed and that the trunk lid is also closed) in Step 9, the flag $f_1$ is turned to 1 so as to set the arming mode (Step 10), and then, the operation goes to Step 51 (FIG. 5). On the other hand, when it is judged that there is a door being open in Step 8, or when the trunk lid is judged to be open in Step 9, it is decided that a condition for setting the arming mode has not been met, and the operation bypasses Step 10 and directly goes to Step 51.

When it is judged that the door locking command code is not included in the signal transmitted from the portable transmitter 51 in Step 4, whether a door unlocking command code is included in the signal transmitted from the portable transmitter 51 is judged (Step 11). When it is judged that the door unlocking command code is included therein, the door lock actuator 10 is controlled so as to unlock the doors (Step 12), and the flag $f_1$ is turned to 0 so as to cancel the arming mode (Step 13).

Whether the flag $f_2$ indicating that the arming mode was set through an engine start by remote operation is 1 or not is judged (Step 14). When the flag $f_2$ is judged to be 1, the flag $f_2$ is returned to 0 (Step 15), and then, the operation goes to Step 51 (FIG. 5). On the other hand, when the flag $f_2$ is judged not to be 1, the operation directly goes to Step 51. Here, the engine is not stopped in the case of receiving the door unlocking command, but in another embodiment, the engine may be stopped also in the case of receiving the door unlocking command. For example, the processing for stopping the engine may be conducted after the flag $f_2$ is returned to 0 in Step 15.

When it is judged that the door unlocking command code is not included in the signal transmitted from the portable transmitter 51 in Step 11, whether an engine start command code is included in the signal transmitted from the portable transmitter 51 is judged (Step 16). When it is judged that the engine start command code is included therein, the operation goes to Step 17, wherein the processing relating to an engine start (see FIG. 3) is conducted, and then, it goes to Step 51 (FIG. 5).

On the other hand, when it is judged that the engine start command code is not included therein in Step 16, whether an engine stop command code is included in the signal transmitted from the portable transmitter 51 is judged (Step 18). When it is judged that the engine stop command code is included therein, the operation goes to Step 19, wherein the processing relating to an engine stop (see FIG. 4) is conducted, and then, it goes to Step 51 (FIG. 5). On the other hand, when it is judged that the engine stop command code is not included therein, the operation directly goes to Step 51.

When it is judged that no signal was received through the antenna 43 and receiving section 44 in Step 2, whether a locking operation through the ignition key 31 was conducted or not is judged (Step 20). When it is judged that the locking operation was conducted, the operation goes to Step 5, wherein the door lock actuator 10 is controlled so as to lock the doors.

On the other hand, when it is judged that no locking operation was conducted, whether an unlocking operation through the ignition key 31 was conducted or not is judged (Step 21). When it is judged that the unlocking operation was conducted, the operation goes to Step 12, wherein the door lock actuator 10 is controlled so as to unlock the doors. On the other hand, when it is judged that no unlocking operation has been conducted, the operation directly goes to Step 51 (FIG. 5).

Figure 3:
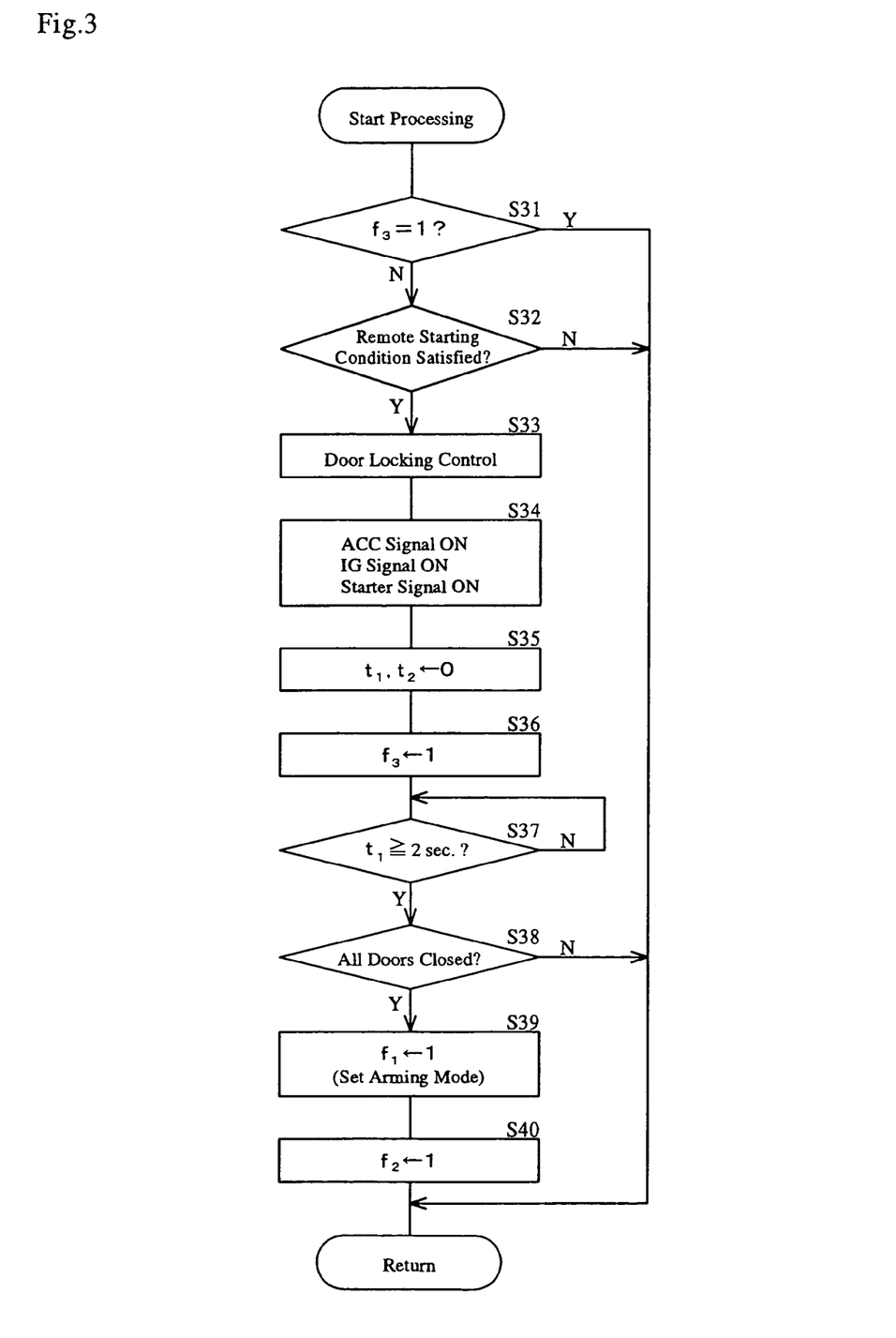
FIG. 3 is a flow chart showing the processing operation performed by the microcomputer in the antitheft device according to the first embodiment.

In the processing relating to an engine start shown in FIG. 3, whether the flag $f_3$ is 1 or not is judged (Step 31). When it is judged that the flag $f_3$ is not 1 (or that the engine is not running), whether the remote starting condition has been met is judged based on information obtained from each of the key insertion detector 6, door opening/closing detector 7, parking brake application detector 49 and selector lever position detector 50 (Step 32). On the other hand, when it is judged that the flag $f_3$ is 1 (or that the engine is already running), the engine start processing is ended at once since the processing operations in Steps 32–40 are not required.

When it is judged that the remote starting condition has been met in Step 32, the door lock actuator 10 is controlled so as to lock the doors (Step 33). And in order to activate the self starter motor 34, the ACC relay 46, IG relay 47 and ST relay 48 are rendered in the ON state so as to provide an ACC signal, an IG signal and a starter signal to the engine controller 33 (Step 34). On the other hand, when it is judged that the remote starting condition has not been met (or that an engine start by remote operation cannot be realized in the condition), the engine start processing is ended at once.

The timer $t_1$ and a timer $t_2$ for measuring an elapsed time from an engine start are reset at 0 and are started up (Step 35). And the flag $f_3$ for indicating that the engine is running is turned to 1 (Step 36). Then, whether the timer $t_1$ has counted to a preset time $t_1''$ (e.g. 2 seconds) or not is judged (Step 37).

When it is judged that the timer $t_1$ has counted to 2 seconds or more (or that 2 seconds has elapsed since the engine start command was received), whether all the doors are closed or not is judged based on information obtained from the door opening/closing detector 7 (Step 38). When it is judged that all the doors are closed, the flag $f_1$ is turned to 1 so as to set the arming mode (Step 39) and the flag $f_2$ is turned to 1 (Step 40). On the other hand, when it is judged that there is a door being open, it is decided that the condition for setting the arming mode has not been met. Steps 39 and 40 are bypassed and the engine start processing is ended at once.

Figure 4:
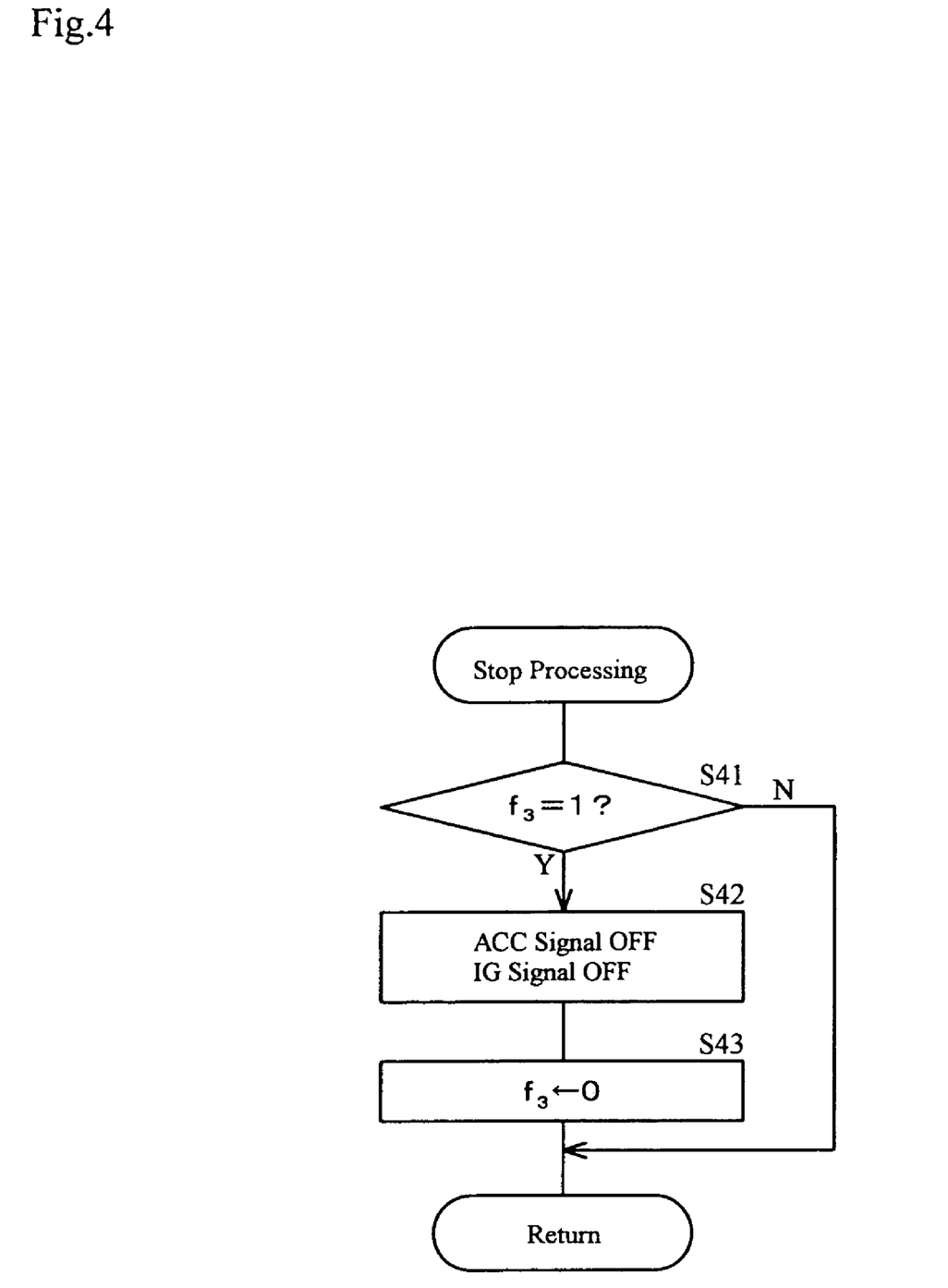
FIG. 4 is a flow chart showing the processing operation performed by the microcomputer in the antitheft device according to the first embodiment.

In the processing relating to an engine stop shown in FIG. 4, whether the flag $f_3$ is 1 or not is judged (Step 41). When it is judged that the flag $f_3$ is 1 (or that the engine is running), in order to stop the engine, the ACC relay 46 and IG relay 47 are rendered in the OFF state so as to stop providing the ACC signal and IG signal to the engine controller 33 (Step 42), and the flag $f_3$ is returned to 0 (Step 43). On the other hand, when it is judged that the flag $f_3$ is not 1 (or that the engine is not running), the engine stop processing is ended at once since the processing operations in Steps 42 and 43 are not required.

In Step 51 shown in FIG. 5, whether the flag $f_1$ indicating that the arming mode has been set is 1 or not is judged. When it is judged that the flag $f_1$ is 1 (or that the arming mode has been set), whether there is a door being open, whether window glass was broken, or whether there is a motion of a person who intruded into the vehicle is judged based on information obtained from the door opening/closing detector 7 or information obtained from the intruder detector 11 (here, a vibration sensor and an ultrasonic sensor) (Steps 52–54). On the other hand, when it is judged that the flag $f_1$ is not 1, the operation directly returns to Step 2 (FIG. 2) since the processing operations in Steps 52–65 are not required.

When it is judged that there is a door being open, that window glass was broken, or that there is a motion of a person who intruded into the vehicle in Steps 52–54, it is decided that the vehicle is in a stolen state. The audible alarm generator 12 is controlled so as to generate an audible alarm (Step 59), and then, the operation returns to Step 2 (FIG. 2).

On the other hand, when it is judged that there is no door being open, that window glass is not broken, or that there is no motion of a person who intruded into the vehicle, whether the flag $f_2$ is 1 or not is judged (Step 55). When it is judged that the flag $f_2$ is not 1 (or the arming mode was set not through an engine start but by a door locking operation), whether the trunk lid is open, whether the vehicle is tilted, or whether the battery voltage is decreased is judged based on information obtained from the trunk opening/closing detector 8 or information obtained from the intruder detector 11 (here, a tilting sensor and a sensor for detecting a decrease in battery voltage) (Steps 56–58).

When it is judged that the trunk lid is open, that the vehicle is tilted, or that the battery voltage is decreased, it is decided that the vehicle is in a stolen state. The audible alarm generator 12 is controlled so as to generate an audible alarm (Step 59), and then, the operation returns to Step 2 (FIG. 2). Here, whether the vehicle is tilted or not may be determined by judging whether the degree $\theta$ of the vehicle obtained from the tilting sensor is not less than a prescribed degree $\theta_1$. Whether the battery voltage is decreased or not may be determined by judging whether the voltage v supplied to the microcomputer 42 is not more than a prescribed value $v_1$. On the other hand, when it is judged that the trunk lid is not open, that the vehicle is not tilted, and that the battery voltage is not decreased in Steps 56–58, the operation directly returns to Step 2.

When it is judged that the flag $f_2$ is 1 (or that the arming mode was set through an engine start) in Step 55, the operation goes to Step 60 since whether the vehicle is in a stolen state need not be decided based on the open state of the trunk lid, the tilting of the vehicle or a decrease in battery voltage (or since the detected subjects for detecting an unauthorized action are reduced).

Whether the flag $f_3$ is 1 or not is judged in Step 60. When it is judged that the flag $f_3$ is 1 (or that the engine is running), the timer $t_2$ has counted to a preset time $t_2'$ (e.g. 10–15 minutes) or more is judged (Step 61). When it is judged that the timer $t_2$ has counted to 10–15 minutes or more (or that 10–15 minutes has elapsed since the engine was started by remote operation), in order to stop the engine, the ACC relay 46 and IG relay 47 are rendered in the OFF state so as to stop providing the ACC signal and IG signal to the engine controller 33 (Step 62). And then, the flag $f_3$ is returned to 0 (Step 63).

Whether the trunk lid is closed or not is judged based on information obtained from the trunk opening/closing detector 8 (Step 64). When it is judged that the trunk lid is closed, the flag $f_2$ is turned to 0 so that the alert status in the arming mode is made the same as that in the arming mode being set by the door locking operation (Step 65). Thereafter, the operation returns to Step 2 (FIG. 2).

On the other hand, when it is judged that the flag $f_3$ is not 1 in Step 60, the operation bypasses Steps 61–63 and goes to Step 64, wherein the alert status in the arming mode is changed (or maintained) based on the open/closed state of the trunk lid. When it is judged that the timer $t_2$ has counted to less than 10–15 minutes in Step 61, the operation directly returns to Step 2 (FIG. 2) since the engine need not be stopped.

Using the antitheft device according to the above first embodiment, not only in a case where all the doors and the trunk lid are closed when 20–30 seconds has elapsed since a remote operation or a key operation for instructing to lock the doors was conducted, but also in a case where all the doors are closed when 2 seconds has elapsed since a remote operation for instructing to start the engine was conducted, the arming mode is set (see Steps 16 and 17 shown in FIG. 2, and FIG. 3). Thus, even if an engine start is conducted by remote operation in a state where the arming mode has not been set, the arming mode is set. As a result, the risk of suffering vehicle theft can be reduced.

In the case of an engine start by remote operation, it is not necessary to suppose that there is a fellow passenger who gets out of the vehicle after the user. Therefore, when an engine start command by remote operation is received, without waiting for 20–30 seconds, the arming mode is set after an elapse of 2 seconds, being shorter (see Steps 35–39 shown in FIG. 3). Thus, the risk of suffering vehicle theft can be further reduced.

In the case of a remote operation for starting the engine, differently from a door locking operation, the arming mode is set even if the trunk lid is open. In other words, the closing of the trunk lid is not included in the condition for setting the arming mode (see Steps 8 and 9 shown in FIG. 2, and Step 38 shown in FIG. 3). Therefore, for example, even if a remote operation for instructing to start the engine is conducted during working such as opening the trunk lid and putting luggage into the trunk space without getting on the vehicle, the arming mode is set. As a result, it becomes possible to improve convenience with crime prevention of vehicle theft maintained.

Using the antitheft device according to the above first embodiment, the detected subjects for detecting an unauthorized action in the arming mode being set through receiving a remote operation for instructing to start the engine are reduced, compared with the detected subjects for detecting an unauthorized action in the arming mode being set through receiving a remote operation or a key operation for instructing to lock the doors.

For example, here, that the trunk lid is opened (see Step 56 shown in FIG. 5), that the vehicle is tilted (see Step 57) and that the battery voltage is decreased (see Step 58) are included in the detected subjects for detecting an unauthorized action in the arming mode being set through receiving a remote operation or a key operation for instructing to lock the doors, but are not included in the detected subjects for detecting an unauthorized action in the arming mode being set through receiving a remote operation for instructing to start the engine.

In the case of an engine start, a case is considered, wherein working such as opening the trunk lid and putting luggage into the trunk space is conducted. Moreover, when the engine is started, the vehicle vibrates and the battery voltage decreases, so that there is a possibility that the tilting sensor, the sensor for detecting a decrease in battery voltage and the like cause errors in detection.

Therefore, as described above, by reducing the detected subjects for detecting an unauthorized action in the arming mode being set through receiving a remote operation for instructing to start the engine, it becomes possible to prevent an audible alarm from being generated in spite of no unauthorized action.

Using the antitheft device according to the above first embodiment, the arming mode is set through receiving a remote operation for instructing to start the engine (in this case, the flag $f_2$ becomes 1). If the engine is stopped thereafter and the trunk lid is closed, the alert status in the arming mode is set to be the same as the alert status in the arming mode being set through receiving a remote operation or a key operation for instructing to lock the doors (see Steps 60–65 shown in FIG. 5).

When the engine is stopped, errors in detection caused by vehicle vibrations, an air flow inside the vehicle, an occurrence of noise and the like originating in an engine start can be resolved, so that the reduction of the detected subjects for detecting an unauthorized action is not required. Since the reduction of the detected subjects for detecting an unauthorized action is ended when it becomes unnecessary, it is possible to further improve the crime prevention of vehicle theft.

Here, the reason why not only the engine stop but also the closing of the trunk lid is included in the condition for setting the alert status in the arming mode to be the same as the alert status in the arming mode being set through receiving a remote operation or a key operation for instructing to lock the doors is that the closing of the trunk lid is not included in the condition for setting the arming mode through receiving a remote operation for instructing to start the engine and that the opening/closing of the trunk lid is excluded from the detected subjects for detecting an unauthorized action in the arming mode.

In the antitheft device according to the above first embodiment, by reducing the detected subjects for detecting an unauthorized action in the arming mode being set through receiving a remote operation for instructing to start the engine, errors in detection by sensors, causing the generation of an audible alarm in spite of no unauthorized action are prevented. But in an antitheft device according to another embodiment, without reducing the detected subjects for detecting an unauthorized action, the detection sensitivity for detecting the unauthorized action in the arming mode being set through receiving a remote operation for instructing to start the engine may be lowered.

For example, in the arming mode being set through receiving a remote operation or a key operation for instructing to lock the doors, it may be decided that the vehicle is in a stolen state when the degree θ of the vehicle obtained from the tilting sensor is not less than a prescribed degree $θ_1$ or when the voltage v supplied to the microcomputer is not more than a prescribed value $v_1$. On the other hand, in the arming mode being set through receiving a remote operation for instructing to start the engine, it may be decided that the vehicle is in a stolen state when the degree θ of the vehicle is not less than a prescribed degree $θ_2$ $(>θ_1)$ or when the voltage v supplied to the microcomputer is not more than a prescribed value $v_2$ $(<v_1)$. And both the reduction of the detected subjects for detecting an unauthorized action and the lower detection sensitivity for detecting the unauthorized action may be adopted.

The antitheft device according to the above first embodiment has a construction having all of the door locking control function, engine control function and theft monitoring function, but an antitheft device according to another embodiment may have a construction without the door locking control function and engine control function, wherein signals showing that door locking/unlocking or an engine start/stop by remote operation was conducted can be captured from another device.

What is claimed is:

1. An antitheft device, comprising:
a first judgment section operable to judge whether a first predetermined condition for setting an arming mode has been met after receiving a command from a user for conducting a prescribed operation;
a first setter operable to set the arming mode when it is judged by said first judgment section that the first predetermined condition has been met;
a second judgment section operable to judge whether a second predetermined condition for setting the arming mode has been met after receiving an engine start command from the user by remote operation for instructing to start an engine; and
a second setter operable to set the arming mode when it is judged by said second judgment section that the second predetermined condition has been met;
wherein the first predetermined condition and the second predetermined condition are different.

2. An antitheft device according to claim 1,
wherein the first predetermined condition includes an elapse of a first preset time after receiving the command from the user for conducting the prescribed operation;
wherein the second predetermined condition includes an elapse of a second preset time after receiving the engine start command from the user by remote operation for instructing to start the engine; and
wherein the second preset time is shorter than the first preset time.

3. An antitheft device according to claim 2,
wherein the second preset time is approximately 0 seconds; and wherein said second setter sets the arming mode as soon as receiving the engine start command by remote operation for instructing to start the engine by the user.

4. An antitheft device according to claim 1,
wherein the first predetermined condition includes that a trunk lid is closed;
whereas the second predetermined condition does not include that the trunk lid is closed.

5. An antitheft device, comprising:
a first judgment section operable to judge whether a first predetermined condition for setting an arming mode has been met after receiving a command from the user for conducting a prescribed operation;
a first setter operable to set the arming mode when it is judged by said first judgment section that the first predetermined condition has been met;
a second judgment section operable to judge whether a second predetermined condition for setting the arming mode has been met after receiving an engine start command from the user by remote operation for instructing to start an engine; and
a second setter operable to set the arming mode when it is judged by said second judgment section that the second predetermined condition has been met
wherein an alert status in the arming mode set by the first setter and an alert status in the arming mode set by the second setter are different.

6. An antitheft device according to claim 5,
wherein detected conditions for detecting an unauthorized action in the arming mode set by the said second setter are less than the detected conditions for detecting an unauthorized action in the arming mode set by said first setter.

7. An antitheft device according to claim 6,
wherein the opening of the trunk lid is not included in the detected conditions in the arming mode set by said second setter.

8. An antitheft device according to claim 5,
wherein a detection sensitivity for detecting an unauthorized action in the arming mode set by said second setter is set lower than the detection sensitivity for detecting the unauthorized action in the arming mode set by said first setter.

9. An antitheft device according to claim 5, further comprising:
a third judgment section operable to judge whether a third predetermined condition has been met in a case where the arming mode by said second setter has been set; and
an alert status setting section operable to set an alert status in the arming mode to be the same as the alert status in the arming mode set by said first setter when it is judged that the third predetermined condition has been met by said third judgment section,
wherein the third predetermined condition includes a stop of the engine.

10. An antitheft device according to claim 5,
wherein the first predetermined condition and the second predetermined condition are different.

11. An antitheft device according to claim 1, further comprising a starter operable to start an engine of a vehicle when receiving the remote operation for instructing to start the engine by the user.

12. An antitheft device, comprising:
a receiving section operable to receive a signal transmitted from a transmitter; and
a microcomputer operatively connected to said receiving section, said microcomputer being operable to generate an alarm when a predetermined status is detected, and to control a start of an engine in response to a signal instructing the start of the engine transmitted from the transmitter, wherein said microcomputer is operable to set an arming mode after a first delay time in response to a signal instructing to set the arming mode transmitted from the transmitter, and to set the arming mode after a second delay time, being shorter than the first delay time, in response to the signal instructing the start of the engine transmitted from the transmitter.

13. An antitheft method, comprising:

setting an arming mode when a first preset time elapses after receiving a command from a user for conducting a prescribed operation; and setting the arming mode when a second preset time, being shorter than the first preset time, elapses after receiving a command from the user by remote operation for instructing to start an engine.

* * * * *